United States Patent [19]

Shirochi et al.

[11] Patent Number: 5,003,388
[45] Date of Patent: Mar. 26, 1991

[54] APPARATUS FOR DISPLAYING A VIDEO SIGNAL

[75] Inventors: Yoshiki Shirochi, Chiba; Hirokazu Takaoka, Kanagawa; Hiroshi Hiraki, Tokyo, all of Japan

[73] Assignee: Sony Corporation, Tokyo, Japan

[21] Appl. No.: 358,241

[22] Filed: May 30, 1989

[30] Foreign Application Priority Data

Jun. 8, 1988 [JP] Japan .................. 63-139133

[51] Int. Cl.⁵ .................. H04N 11/20; H04N 7/01
[52] U.S. Cl. .................. 358/140; 358/11; 358/59
[58] Field of Search .................. 358/59, 140, 11, 135, 358/136, 137, 240, 241, 236

[56] References Cited

U.S. PATENT DOCUMENTS

| | | | |
|---|---|---|---|
| 4,587,557 | 5/1986 | Doornhein et al. | 358/140 |
| 4,694,337 | 9/1987 | Lyons | 358/140 |
| 4,897,799 | 1/1990 | Le Gall et al. | 358/11 |

Primary Examiner—Howard W. Britton
Assistant Examiner—Michael H. Lee
Attorney, Agent, or Firm—Lewis H. Eslinger

[57] ABSTRACT

An apparatus for displaying a video signal has a plurality of display elements corresponding to one standard of the television signal disposed in an X-Y matrix shape. The apparatus includes a separator for separating a sync signal from an input video signal, a control signal generator for generating a control signal in response to the sync signal, a driver for driving the display elements in response to the video signal and control signal, and a converter for changing the number of scanning lines in response to a timing changing in each frame when a different standard of the television signal is supplied as the input video signal.

12 Claims, 5 Drawing Sheets

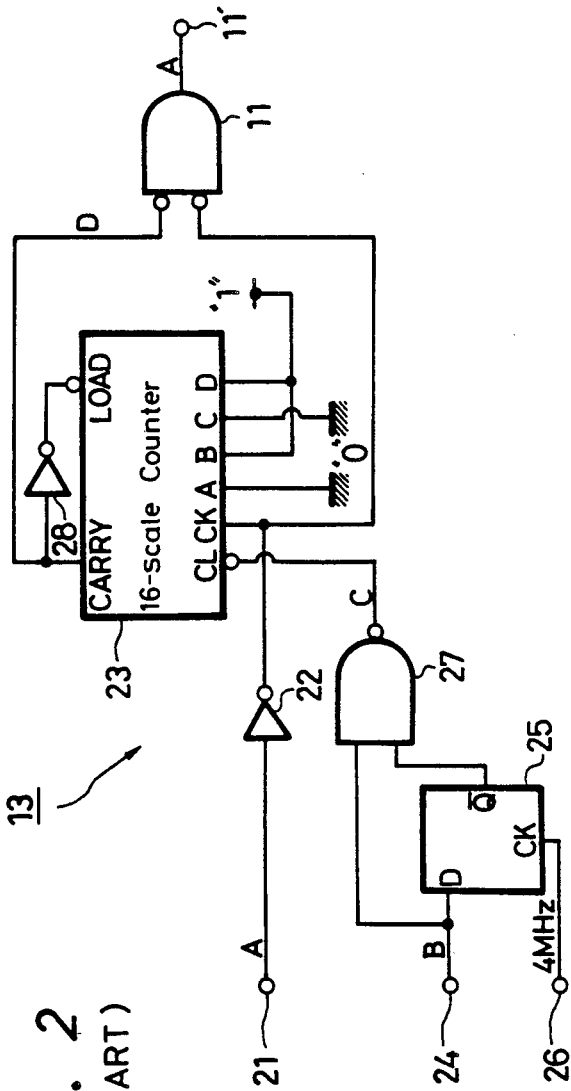
FIG. 2 (PRIOR ART)
FIG. 3A Horizontal Sync. Signal HD
FIG. 3B Reset Signal
FIG. 3C Clear Signal
FIG. 3D Gate Signal

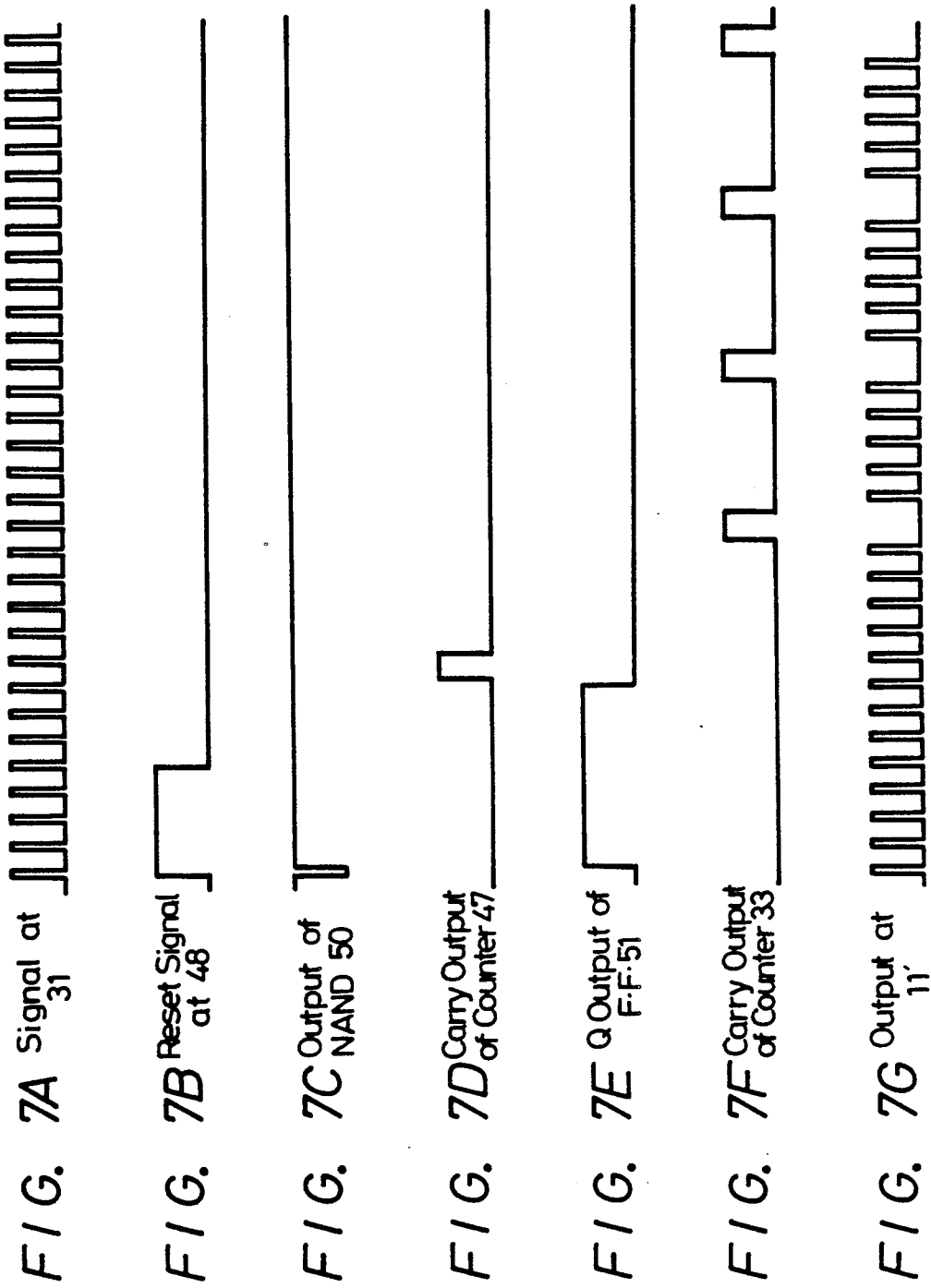

APPARATUS FOR DISPLAYING A VIDEO SIGNAL

BACKGROUND OF THE INVENTION

1. Field of the Invention

The present invention relates generally to display apparatus and, more particularly, is directed to a display apparatus that is suitably applied to a display panel apparatus in which a number of liquid crystals or a number of fluorescent phosphor tubes are arranged in a two-dimensional manner or in an X-Y matrix shape.

2. Description of the Prior Art

In order to understand the present invention more clearly, a prior-art display apparatus utilizing, for example, a liquid crystal display panel will be described hereinunder with reference to FIG. 1. FIG. 1 shows an overall arrangement of a prior-art display apparatus.

Referring to FIG. 1, it will be seen that a video signal applied to a video input terminal 1 is supplied to a luminance signal (Y) and chroma signal (C) separating circuit (Y/C separating circuit) 2 which processes the video signal to provide a luminance signal Y and a chroma signal C. The video signal applied to the input terminal 1 is also supplied to a synchronizing separating circuit 3, from which there are derived a horizontal synchronizing signal HD which separates the respective lines of successive frames of the television image, and a synchronizing signal SYNC, respectively. The luminance signal Y, the chrominance signal C, the horizontal synchronizing signal HD and the synchronizing signal SYNC are all supplied to an RGB decoder 4 which generates red, green and blue three primary color signals R, G and B. The red, green and blue primary color signals R, G and B are respectively supplied to amplifiers 5R, 5G and 5B which generate signals of positive and negative polarities. These signals of positive and negative polarities are supplied to an alternate current drive switch 6.

A composite synchronizing signal from the separating circuit 3 is supplied to a display panel control signal generating circuit 7, whereby the display panel control signal generating circuit 7 supplies a field pulse which inverts its polarity at every field to the switch 6. The switch 6 generates as a result red, green and blue signals R, G and B which are made alternate current signals at every field. The red, green and blue signals R, G and B from the switch 6 are supplied to a data driver 8.

The data driver 8 is also supplied with a picture element clock signal, a reset signal, a transfer timing signal and an output timing signal from the generating circuit 7 in synchronism with the horizontal synchronizing signal. These signals are supplied through gate circuits 9a, 9b, 9c and 9d to the data driver 8. The generating circuit 7 supplies a reset signal synchronized with a vertical synchronizing signal to a scan driver 10, and also supplies a horizontal synchronizing signal HD through a gate circuit 11 to the scan driver 10. The data driver 8 and the scan driver 10 drive a display panel 12, whereby the video signal applied to the terminal 1 is sampled at every pixel by the data driver 8 and is supplied to the display panel 12 in response to the transfer timing signal and to the output timing signal, while the scan driver 10 sequentially selects the respective horizontal scanning lines, thereby displaying a video image on the display panel 12.

In the prior-art display apparatus as described above, it is proposed that the display panel 12 might have 512 display scanning lines which correspond to an effective picture area according, for example, to the NTSC system.

It is also proposed to produce this kind of display apparatus which displays a video signal according to the CCIR system. The effective picture area according to the CCIR system has more than 600 display scanning lines, and in the manufacturing-process of this kind of display panel, the yield of such display panel is not satisfactory. In addition, the demand for the display panel according to the CCIR system is expected to be very small as compared with the display panel according to the NTSC system.

In order to solve the above-mentioned problem, it is proposed that a video image according to the CCIR system is displayed on the above-mentioned display panel of the NTSC system. According to this proposal, a ratio between the CCIR and NTSC horizontal scanning lines is about 6:5, whereby the video image according to the CCIR system can be displayed on the display panel according to the NTSC system by throwing away or deleting the horizontal scanning lines of the video image according to the CCIR system at the ratio of 1:6.

To meet this proposal, as shown in FIG. 1, the generating circuit 7 supplies the horizontal synchronizing signal HD and the reset signal synchronized with the vertical synchronizing signal to a counter 13, and the output signal from the counter 13 is used to control the gate circuits 9a to 9d and the gate circuit 11. The counter 13 effects the above removal of the horizontal scanning lines, and will be described more fully with reference to a block diagram forming FIG. 2. In FIG. 2, like parts corresponding to those of FIG. 1 are marked with the same references and therefore need not be described in detail.

Referring to FIG. 2, it will be seen that the horizontal synchronizing signal HD from the generating circuit 7 (FIG. 1) is supplied to a terminal 21. The signal from the terminal 21 is supplied through an inverter 22 to a clock input terminal CK of a 16-scale counter 23. The waveform of the signal applied to the terminal 21 is shown in FIG. 3A. The reset signal synchronized with the vertical synchronizing signal is supplied to a terminal 24 from the generating circuit 7 (shown in FIG. 1), and the reset signal from the terminal 24 is fed to a D input terminal of a D flip-flop 25. The waveform of the reset signal is illustrated in FIG. 3B. Also, a clock signal having a frequency of, for example, 4 MHz applied to a terminal 26 is supplied to a clock input terminal CK of the D flip-flop 25. The output signal developed at the $\overline{Q}$ output terminal of the D flip-flop 25 and the reset signal from the terminal 24 are supplied to a NAND circuit 27. The output (whose waveform is illustrated in FIG. 3C) from the NAND circuit 27 is fed to the clear input terminal CL of the counter 23. Of the data input terminals A to D of the counter 23, a signal of "0" (low level) is supplied to the data input terminal A (least significant bit) and to the data input terminal C, whereas a signal of "1" (high level) is supplied to the data input terminal B and to the data input terminal D (most significant bit). Data [10] (decimal value) is therefore inputted to the counter 23. The carry output of the counter 23 is supplied through an inverter 28 to the load input terminal LOAD of the counter 23.

According to the circuitry shown in FIG. 2, when the horizontal synchronizing signal HD shown in FIG. 3A is supplied to the terminal 21 and the reset signal shown in FIG. 3B is supplied to the terminal 24, the NAND circuit 27 derives the clear signal whose waveform is shown in FIG. 3C. The signal from the NAND circuit 27 is supplied to the clear terminal CL of the counter 23, whereby the counter 23 derives a carry output when counting the horizontal synchronizing signal HD from the terminal 21 16 counts after having received the signal at its clear input terminal CL. Further, when this carry output is supplied to the load input terminal LOAD of the counter 23, the data of [10] is loaded to the counter 23. Then, the counter 23 therefore generates the carry output each time it counts the signal from the terminal 21 6 times as shown in FIG. 3D.

When the carry output and the signal from the terminal 21 are supplied to the gate circuit (NOR circuit) 11, the NOR circuit 11 generates at its output terminal 11' the horizontal synchronizing signal HD from which every sixth whose pulse is removed as shown by a phantom pulse in FIG. 3A.

The thus processed horizontal synchronizing signal HD is supplied to the scan driver 10 (shown in FIG. 1), whereby during the period of the thus removed horizontal synchronizing signal, the horizontal scanning position of the display panel 12 is not advanced and the signals from the data driver 8 are neglected, thus resulting in the pulse of the horizontal synchronizing signal being removed (scanning line is converted). In that event, the supply of the clock signal, the reset signal, the transfer timing signal and the output timing signal from the generating circuit 7 to the data driver 8 is stopped by the gate circuits 9a to 9d, whereby a disturbance can be prevented from being caused by an undesired signal.

In this way, the video image according to the CCIR system can be displayed on the NTSC display panel by removing the scanning lines at the ratio of 1:6.

In a case of the above-mentioned display apparatus, the position of the horizontal scanning line at which the pulse is removed is fixed in the position of every sixth horizontal scanning line on the basis of, for example, the 16th horizontal scanning line from the vertical synchronizing signal (the reset signal). If a video image is presented as shown in FIG. 4A, then a picture processed by the removal of the horizontal scanning lines becomes as shown in FIG. 4B, in which the oblique straight line shown in FIG. 4A is distorted in a stepwise fashion as shown in FIG. 4B. Further, since the position of the horizontal scanning line removed is fixed with respect to successive frames of the television image as described above, these stepwise-distorted portions become very conspicuous.

Furthermore, if a still picture is zoomed or if it is moved upward or downward, the zooming speed or the moving speed of the picture is varied at the position in which the horizontal scanning line is removed, thus resulting in a flicker being produced at the boundary portion of the picture, etc. This flicker deteriorates the image quality considerably.

OBJECTS AND SUMMARY OF THE INVENTION

Accordingly, it is an object of the present invention to provide an improved display apparatus that can remove the above-mentioned defects inherent in the prior art.

Specifically, it is an object of the present invention to provide a display apparatus which can avoid the scanning line-converted position from becoming conspicuous.

It is another object of the present invention to provide a display apparatus which can display a video image satisfactorily.

In accordance with an aspect of the present invention, there is provided an apparatus for displaying a video signal having a plurality of display elements corresponding to one standard of the television signal disposed in an X-Y matrix shape, said apparatus comprising:

(a) separator means for separating a sync signal from an input video signal;

(b) generator means for generating a control signal in response to said sync signal;

(c) drive means for driving said display elements in response to said video signal and control signal; and (d) converter means for changing the number of scanning lines in response to a timing changing in each frame when a different standard of the television signal is supplied as said input video signal.

The above, and other objects, features and advantages of the present invention will be apparent in the following detailed description of illustrative embodiments when read in conjunction with the accompanying drawings, in which the same reference numerals identify corresponding parts in the several views.

BRIEF DESCRIPTION OF THE DRAWINGS

FIG. 2 is a block diagram showing an example of a counter used in the prior-art display apparatus shown in FIG. 1;

FIGS. 3A to 3D are waveform diagrams used to explain the operation of the counter shown in FIG. 2, respectively;

FIGS. 7A to 7G are respective waveform diagrams used to explain the operation of the embodiment of the present invention shown in FIG. 6.

DETAILED DESCRIPTION OF PREFERRED EMBODIMENTS

Now, the present invention will hereinafter be described with reference to the drawings.

Figure 1:
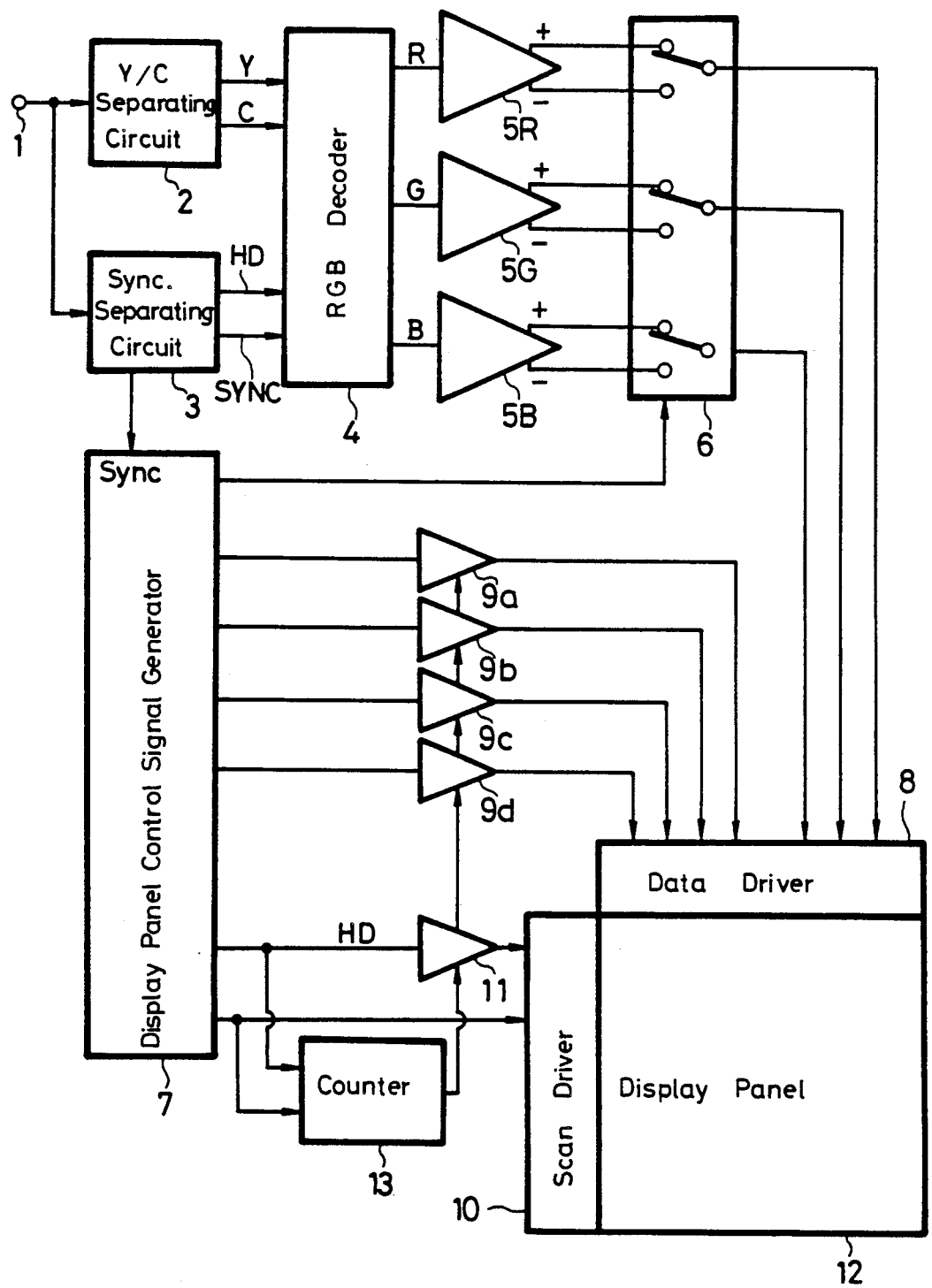
FIG. 1 is a block diagram showing an example of a prior-art display apparatus.
Figure 4A:
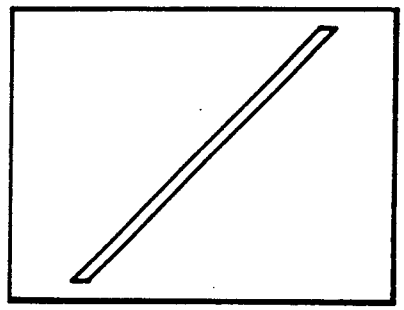
FIGS. 4A and 4B are schematic representations of pictures used to explain the defects of the prior-art display apparatus shown in FIG. 1, respectively.
Figure 4B:
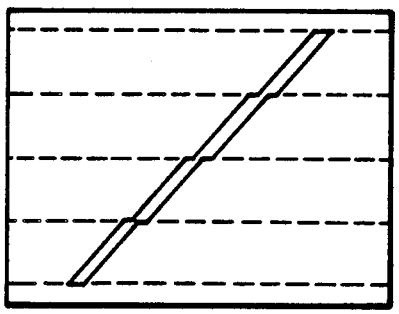
Figure 5:
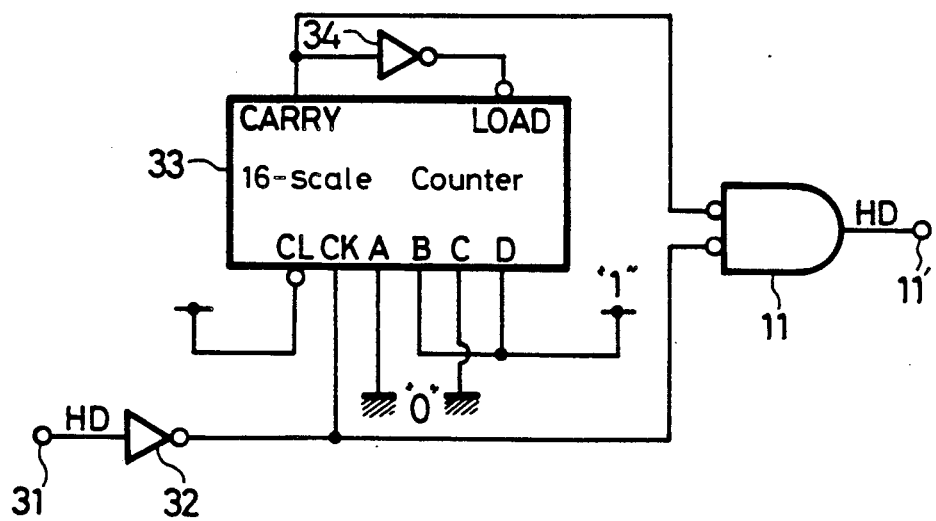
FIG. 5 is a block diagram showing a main portion of an embodiment of a display apparatus according to the present invention.

FIG. 5 illustrates a main portion of an embodiment of a display apparatus according to the present invention. In FIG. 5, like parts corresponding to those of FIGS. 1 and 2 are marked with the same references.

Referring to FIG. 5, it will be seen that the horizontal synchronizing signal HD from the generating circuit 7 (see FIG. 1) is supplied to a terminal 31. The horizontal synchronizing signal HD applied to the terminal 31 is supplied through an inverter 32 to a clock input terminal CK of a 16-scale counter 33. Of the data input terminals A to D of the counter 33, data of "0" (low level) is supplied to the data input terminals A and C, whereas data of "1" (high level) is supplied to the data input terminals B and D so that !101 is inputted to the counter 33 as the input data. Further, data of "1" is fed to the clear input terminal CL of the counter 33. The carry output of the counter 33 is supplied through an inverter 34 to the load input terminal LOAD of the counter 33.

It is to be noted that the present embodiment shown in FIG. 5 is different from the above prior art shown in FIG. 2 only in that the system of the reset signal (applied to the terminal 24 in FIG. 2) is removed and that data of "1" is supplied to the clear terminal CL of the counter 23.

According to the circuit shown in FIG. 5, the counter 33 generates the carry output each time it counts 6 occurrences of the horizontal synchronizing signal HD from the terminal 31 in the stationary state. When the carry output and the horizontal synchronizing signal HD from the terminal 31 are supplied to the gate circuit (NOR circuit) 11, the NOR circuit 11 generates at its output terminal 11' a horizontal synchronizing signal HD in which five sampling pulses are selected and one sampling pulse is thrown away. The resultant horizontal synchronizing signal HD is supplied to the scan driver 10 (see FIG. 1), whereby during the period of this horizontal synchronizing signal HD, the horizontal scanning position on the display panel 12 (FIG. 1) is not advanced and the signal fed from the data driver 8 (FIG. 1) during this period is neglected. Thus the scanning lines are selectively removed (the conversion of scanning lines is effected). Simultaneously, the supply of the clock signal, the reset signal, the transfer timing signal and the output timing signal from the generating circuit 7 to the data driver 8 is stopped by the gate circuits 9a to 9d in FIG. 1.

The CCIR system, for example, employs 625 horizontal scanning lines per frame, and a reminder of 1 is left by dividing 625 by 6, whereby the position in which the horizontal scanning line is converted is sequentially changed at every frame.

According to the above-mentioned circuit shown in FIG. 5, the position at which the horizontal scanning line is converted is varied at every frame so that the above position can be prevented from becoming conspicuous. Hence, the video image can be displayed excellently.

Figure 6:
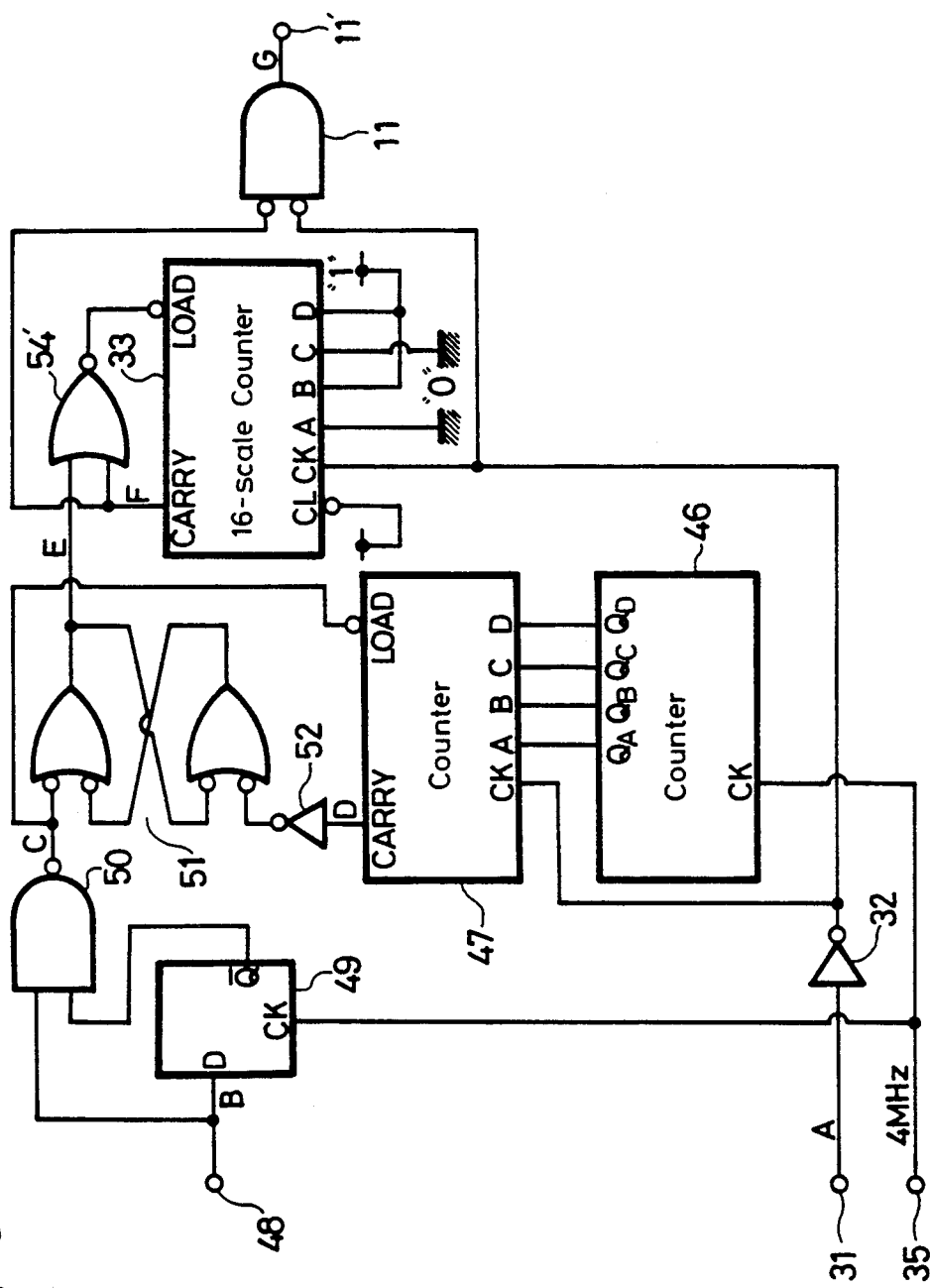
FIG. 6 is a block diagram showing a main portion of another embodiment of a display apparatus according to the present invention.

FIG. 6 illustrates a main portion of another embodiment of a display apparatus according to the present invention. In FIG. 6, like parts corresponding to those of FIG. 5 are marked with the same references and for simplicity will not be described.

Referring to FIG. 6, it will be seen that the signal applied to the input terminal 31 is supplied through the inverter 32 to the clock terminal CK of the counter 33. The waveform of this signal applied to the input terminal 31 is shown in FIG. 7A. A clock signal having a frequency of, for example, 4 MHz from a terminal 35 is supplied to a clock terminal CK of a counter 46. The count outputs $Q_A$, $Q_B$, $Q_C$ and $Q_D$ of the counter 46 are supplied to data input terminals A to D of a counter 47. Further, the signal from the inverter 32 is supplied to the clock input terminal CK of the counter 47.

The reset signal synchronized with the vertical synchronizing signal from the generating circuit 7 (see FIG. 1) is supplied to a terminal 48. The signal from the terminal 48 is supplied to a D input terminal of a D flip flop 49. The waveform of the reset signal is shown in FIG. 7B. The D flip-flop 49 is also supplied at its clock input terminal CK with the signal of 4 MHz from the terminal 35. The $\overline{Q}$ output of the D flip-flop 49 and the reset signal applied to the terminal 48 are supplied to a NAND circuit 50. The output of the NAND circuit 50 is supplied to the load input terminal LOAD of the counter 47 and is also fed to the set input terminal of a flip-flop 51. The waveform of the above NAND output is shown in FIG. 7C. The carry output from the counter 47 is supplied through an inverter 52 to the reset input terminal of the flip-flop 51. The waveform of the carry output from the counter 47 is represented in FIG. 7D. The Q output of the flip-flop 51 and the carry output of the counter 33 are mixed by a NOR circuit 54', and the mixed output from the NOR circuit 54' is fed to the load input terminal LOAD of the counter 33.

In accordance with the above-mentioned circuit, when the signal shown in FIG. 7A is supplied to the terminal 31 and the reset signal shown in FIG. 7B is supplied to the terminal 48, the NAND circuit 50 derives the signal whose waveform is shown in FIG. 7C. When the signal from the NAND circuit 50 is supplied to the load input terminal LOAD of the counter 47, the count value of the counter 46 at that time is loaded to the counter 47. The count value to be loaded to the counter 47 is randomly determined by the counter 46. Thus, the counter 47 derives the carry output whose waveform is illustrated in FIG. 7D. This carry output is supplied through the inverter 52 to the reset terminal of the flip-flop 51 so that the flip-flop 51 is reset to generate the Q output whose waveform is shown in FIG. 7E.

More specifically, in accordance with the above-mentioned circuit shown in FIG. 6, the trailing edge of the Q output from the flip-flop 51 is determined by the value to be loaded to the counter 47, and this load value is randomly determined by the counter 46. The Q output of the flip-flop 51 is supplied through the NOR circuit 54' to the load input terminal LOAD of the counter 33, whereby data of 10) is loaded to the counter 33. Further, the carry output of the counter 33 is supplied to its load input terminal LOAD so that the counter 33 generates a carry output shown in FIG. 7F each time it counts the signal from the terminal 31 six times.

Thus, when the carry output from the counter 33 and the signal from the terminal 31 are supplied to the gate circuit (NOR circuit) 11, the NOR circuit 11 generates at its output terminal 11' a horizontal synchronizing signal HD in which 5 pulses are selected and one pulse is removed as shown in FIG. 7G.

In this case, the timing of the first loading operation executed at every vertical synchronizing signal in the counter 33 is randomly determined by the count value of the counter 46, whereby the timing is randomly varied in each frame.

Further, the above circuit of the invention can be applied to the case that, in scanning line conversion to insert the scanning line, the insertion timing is determined.

According to the present invention, as described above, since the position of the horizontal scanning line conversion is varied at every frame, the above scanning line conversion position can be prevented from becoming conspicuous and an excellent display can be always effected.

Although preferred embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

We claim as our invention:

1. Apparatus for displaying a video signal and comprising:
    a plurality of display elements of number and arrangement to display a television signal conforming to a first standard, the display elements being arranged in an X-Y matrix shape;
    input means for receiving an input video signal conforming to a second standard and including a sync signal and a number of scanning lines per frame corresponding to said second standard;
    separator means for separating said sync signal from said input video signal;
    generator means for generating a control signal in response to said sync signal;
    drive means for generating a control signal in response to said sync signal;
    drive means for driving said display elements in response to said input video signal and control signal; and
    converter means for changing the number of scanning lines per frame of said input video signal that are displayed by deleting selected horizontal scan lines, in response to a timing signal that changes from one frame to a following frame, so that locations of the horizontal scan lines that are deleted are changed from frame to frame.

2. Apparatus according to claim 1, wherein said timing signal including gate pulses whose position is shifted by one scanning line per frame, so that the locations of the horizontal scan lines that are deleted are sequentially changed in successive frames.

3. Apparatus according to claim 2, wherein said timing signal includes gate pulses whose position is changed arbitrarily in each successive frame, so that different horizontal scan lines are deleted in successive frames.

4. Apparatus according to claim 1, wherein said first standard is NTSC and the second standard is CCIR.

5. Apparatus according to claim 1, wherein said display elements are liquid crystal panels.

6. Apparatus according to claim 1, wherein said sync signal includes a horizontal sync signal and said converter means includes a counter having said horizontal sync signal connected to a clock input thereof and having a clear input held to a high level; and having one input connected to said horizontal sync signal and another input connected to a carry output of said counter, whereby the output of said gating means provides said timing signal and the horizontal scan lines that are deleted are determined by a preselected count of said counter.

7. Apparatus according to claim 6, wherein the preselected count in said counter is selected so that the number of horizontal scanning lines making up a frame of said second standard divided by the preselected count of said counter results in a nonzero integer remainder.

8. Apparatus according to claim 8, wherein said converter means includes second counter means for producing a random gating signal pulse and a second gating means for gating the carry output of the first counter with said random gating signal to produce a randomly varying carry signal fed to the first gating means, whereby the locations of the scanning lines that are deleted vary randomly.

9. Apparatus for displaying a video signal that includes a sync signal and is organized in successive frames that respectively include a first number or a second number of display lines, said second number being larger than said first number and said apparatus comprising:
    a plurality of display elements arranged in a number of lines equal to said first number;
    input means for receiving said video signal;
    separator means for separating said sync signal from said video signal;
    generator means for generating a control signal in response to said sync signal;
    drive means for driving said display elements in response to said video signal and said control signal; and
    converter means responsive to said video signal when successive frame thereof include said second number of display lines for deleting selected ones of said display lines, thereby leaving said first number of display lines to be displayed;
    wherein said lines selected for deletion correspond to different locations in said successive frames.

10. Apparatus according to claim 9, wherein said means for changing in said converter means includes a counter having said horizontal sync signal connected to a clock input thereof and having a clear input held to a high level; and
    gating means having one input connected to said horizontal sync signal and another input connected to a carry output of said counter, whereby the output of said gating means provides said timing signal and the horizontal scan lines that are deleted are determined by a preselected count of said counter.

11. Apparatus according to claim 8, wherein the preselected count in said counter is selected so that division of said first number of displaylines by the preselected count results in a nonzero integer remainder.

12. Apparatus according to claim 8, wherein said converter means includes second counter means for producing a random gating signal pulse and a second gating means for gating the carry output of the first counter with said random gating signal to produce a randomly varying carry signal fed to the first gating means, whereby the scanning line that is deleted varies randomly.

* * * * *

UNITED STATES PATENT AND TRADEMARK OFFICE
CERTIFICATE OF CORRECTION

PATENT NO. : 5,003,388
DATED : March 26, 1991
INVENTOR(S) : Yoshiki Shirochi, Hirokazu Takaoka, Hiroshi Hiraki It is certified that error appears in the above-identified patent and that said Letters Patent is hereby corrected as shown below:

```
Col. 1, line 26, after "HD" insert --,--
Col. 3, line 17, delete "whose"
Col. 4, line 61, delete "30"
        line 66, change "!101" to --[10]--
Col. 5, line 62, after "flip" insert -- - --
Col. 6, line 34, change "10)" to --[10]--
```

In the Claims:

```
Col. 7, lines 17 and 18, delete "drive means for generating
        a control signal in response to said sync signal;"
Col. 8, line 3, change "claim 8" to --claim 6--
        line 28, change "frame" to --frames--
        line 48, change "displaylines" to --display lines--
```

Signed and Sealed this

Twenty-ninth Day of December, 1992

*Attest:*

DOUGLAS B. COMER

*Attesting Officer*          Acting Commissioner of Patents and Trademarks